(12) United States Patent
Oyen et al.

(10) Patent No.: US 9,939,085 B2
(45) Date of Patent: Apr. 10, 2018

(54) PIPE CLAMP PROVIDED WITH A TENSION GAUGE AND USE OF A TENSION GAUGE ON A PIPE CLAMP

(71) Applicant: Depro AS, Bryne (NO)

(72) Inventors: Rune Oyen, Naerbo (NO); Odd Rune Holland, Sirevag (NO); Arne Hodne, Kleppe (NO)

(73) Assignee: Depro AS, Bryne (NO)

( * ) Notice: Subject to any disclaimer, the term of this patent is extended or adjusted under 35 U.S.C. 154(b) by 153 days.

(21) Appl. No.: 14/423,272

(22) PCT Filed: Aug. 22, 2013

(86) PCT No.: PCT/NO2013/050135
§ 371 (c)(1),
(2) Date: Feb. 23, 2015

(87) PCT Pub. No.: WO2014/031008
PCT Pub. Date: Feb. 27, 2014

(65) Prior Publication Data
US 2015/0226352 A1    Aug. 13, 2015

(30) Foreign Application Priority Data

Aug. 24, 2012   (NO) .................................. 20120957

(51) Int. Cl.
*F16L 1/26* (2006.01)
*F16L 23/00* (2006.01)
(Continued)

(52) U.S. Cl.
CPC .................. *F16L 1/26* (2013.01); *F16L 23/00* (2013.01); *F16L 23/003* (2013.01); *F16L 23/08* (2013.01);
(Continued)

(58) Field of Classification Search
CPC ............ G01L 19/0007; G01L 19/0038; G01L 19/143; F16L 23/08; F16L 23/10; F16L 23/003
See application file for complete search history.

(56) References Cited

U.S. PATENT DOCUMENTS 3,199,057 A * 8/1965 Gindes .................. G01L 1/2231
338/36
3,866,473 A * 2/1975 Teitelbaum ........... G01L 9/0002
24/486
(Continued)

FOREIGN PATENT DOCUMENTS

GB          2454220 A      5/2009
WO        2005116505      12/2005
(Continued)

OTHER PUBLICATIONS

International Search Report and Written Opinion for PCT/NO2013/050135 dated Dec. 11, 2013.

*Primary Examiner* — David E Bochna
(74) *Attorney, Agent, or Firm* — Andrus Intellectual Property Law, LLP

(57) ABSTRACT

A pipe damp is for joining submerged pipes provided with flanges. The pipe clamp includes at least two segments connected by at least one hinge. The pipe clamp is further provided with a threaded bolt arranged to open and close the pipe clamp. The pipe clamp is provided with at least one strain gauge arranged to measure the tension of the pipe clamp around the flange of the pipe when the pipe clamp is dosed by the threaded bolt. A method is for tensioning a pipe clamp. Use of strain gauges to measure the tension of a pipe clamp is provided.

10 Claims, 2 Drawing Sheets

(51) Int. Cl.
*G01L 5/00* (2006.01)
*F16L 23/08* (2006.01)

(52) U.S. Cl.
CPC ......... *G01L 5/0028* (2013.01); *F16L 2201/10* (2013.01)

(56) References Cited

U.S. PATENT DOCUMENTS

| | | | | |
|---|---|---|---|---|
| 3,965,736 A * | 6/1976 | Welton | ................... | F04B 49/10 73/152.61 |
| 4,090,405 A * | 5/1978 | McKee | ................... | G01L 5/102 73/152.61 |
| 4,932,253 A * | 6/1990 | McCoy | ............... | E21B 47/0006 73/152.61 |
| 5,499,542 A * | 3/1996 | Morlan | ............... | F16K 37/0083 73/818 |
| 5,717,143 A | 2/1998 | Jenco et al. | | |
| 5,747,697 A * | 5/1998 | Johnson | ................... | G01B 7/16 73/168 |
| 6,941,820 B2 * | 9/2005 | Lee | ....................... | G01L 5/0076 73/860 |
| 7,357,628 B2 * | 4/2008 | Lee | ..................... | B29C 45/7653 164/151 |
| 2005/0275557 A1 | 12/2005 | Newbert | | |
| 2008/0265568 A1 | 10/2008 | Bekkevold | | |
| 2011/0303523 A1 * | 12/2011 | Walker | ................... | F16K 17/16 200/83 R |

FOREIGN PATENT DOCUMENTS

| | | |
|---|---|---|
| WO | 2009/051591 | 4/2009 |
| WO | 2009100084 | 8/2009 |
| WO | 2011/072327 | 6/2011 |
| WO | 2012/107766 | 8/2012 |

* cited by examiner

PIPE CLAMP PROVIDED WITH A TENSION GAUGE AND USE OF A TENSION GAUGE ON A PIPE CLAMP

CROSS-REFERENCE TO RELATED APPLICATIONS

This application is the U.S. national stage application of International Application PCT/NO2013/050135, filed Aug. 22, 2013, which international application was published on Feb. 27, 2014, as International Publication WO2014/031008 in the English language. The international application is incorporated herein by reference, in entirety. The international application claims priority to Norwegian Patent Application Serial No. 20120957, filed Aug. 24, 2012, which is incorporated herein by reference, in entirety.

FIELD

The invention relates to a pipe clamp. More specifically, the invention relates to a pipe clamp provided with a tension gauge for checking that the pipe clamp has been correctly tensioned or tightened after having been opened.

BACKGROUND

Pipe clamps are used on pipes of different diameters. It is known to use pipe clamps to connect flanged pipes as an alternative to a bolted flange connection. It is also known to use pipe clamps to connect a flanged pipe to a sealing end cap. Pipe clamps that are to connect relatively large pipes, and in particular submerged pipes, must enable closing with great force. Patent document WO 2005/116505 discloses an example of a two-part pipe clamp for use in underwater operations. It is known within the art that such a pipe clamp may have three parts.

Pipe clamps connecting submerged pipes may be provided with a screw mechanism on one side of the pipe, and the screw may be oriented perpendicularly to the longitudinal axis of the pipe, A threaded bolt is tightened or loosened by means of a so-called ROV (Remote-Operated Vehicle) which is provided with a rotary tool with a gear transmission to apply a sufficient torque to the bolt. It is essential that the pipe clamp is tensioned with the correct torque around the pipe. If torque is too small, the connection is not reliable, and if the torque is too great, the connection may be damaged. When a new pipe damp is fitted, the tightening torque of the bolt is measured by means of the rotary tool, The rotary tool is calibrated on the surface before the ROV submerges. The ROV tightens the bolt until the desired torque is read on the rotary tool.

Pipe damps holding together submerged pipes that are used in the recovery of petroleum, for example, are dimensioned for a lifetime of at least 20 years. During the lifetime of the pipe clamp it may be necessary to perform maintenance work on the pipeline so that the pipe clamp must be opened to give access to the inside of the pipeline. After maintenance work has been performed, the pipe clamp is to be tensioned again to the desired torque. In the course of the time during which the pipe clamp has been submerged, sediment has covered portions of the surfaces and parts of the pipe clamp. Corrosion may have arisen in the joints and threads of the pipe clamp. This results in there being no guarantee, even if the measured torque of the rotary tool corresponds to the measured torque when the bolt was tightened as the pipe clamp was being fitted the first time, that the pipe clamp has been tensioned to the same torque around the pipe.

SUMMARY

The invention has for its object to remedy or reduce at least one of the drawbacks of the prior art or at least provide a useful alternative to the prior art.

The object is achieved through features which are specified in the description below and in the claims that follow.

In a first aspect, the invention relates to a pipe clamp for connecting submerged pipes provided with flanges, the pipe including at least two segments connected with at least one hinge, the pipe clamp further being provided with a tensioning member arranged to open and close the pipe clamp, and the pipe clamp being provided with at least one strain gauge arranged to measure the tension of the pipe clamp around the flange of the pipe when the pipe clamp is closed by means of the tensioning member.

The at least one strain gauge may be positioned in a recess in the circumferential surface of one of the segments. In an alternative embodiment, the at least one strain gauge may be positioned in a recess in the surface of at least one of the hinge elements. In an alternative embodiment, the at least one strain gauge may be positioned on at least one pin in the hinge. In a further alternative embodiment, the at least one strain gauge may be positioned on at least one threaded bolt. In a further alternative embodiment, the at least one strain gauge may be positioned on the tensioning member, In a second aspect, the invention relates to a method of tensioning a pipe clamp around a submerged pipe provided with a flange, the method including the steps:
a) providing a pipe clamp;
b) providing the pipe clamp with at least one strain gauge;
c) calculating the reading value of the strain gauge at the desired tensioning torque;
d) equipping an ROV with an apparatus arranged to read the strain gauge;
e) equipping the ROV with a tool for operating a tensioning member;
f) tensioning the pipe clamp by means of the tensioning member; and
g) stopping the tensioning when the strain gauge shows that the correct tension in the pipe clamp has been achieved.

In a third aspect, the invention relates to the use of at least one strain gauge to measure the tension of a pipe clamp which is arranged to hold a submerged, flanged pipe together.

BRIEF DESCRIPTION OF THE DRAWINGS

In what follows, an example of a preferred embodiment is described, which is visualized in the accompanying drawings, in which.

DETAILED DESCRIPTION OF THE DRAWINGS

Figure 1:
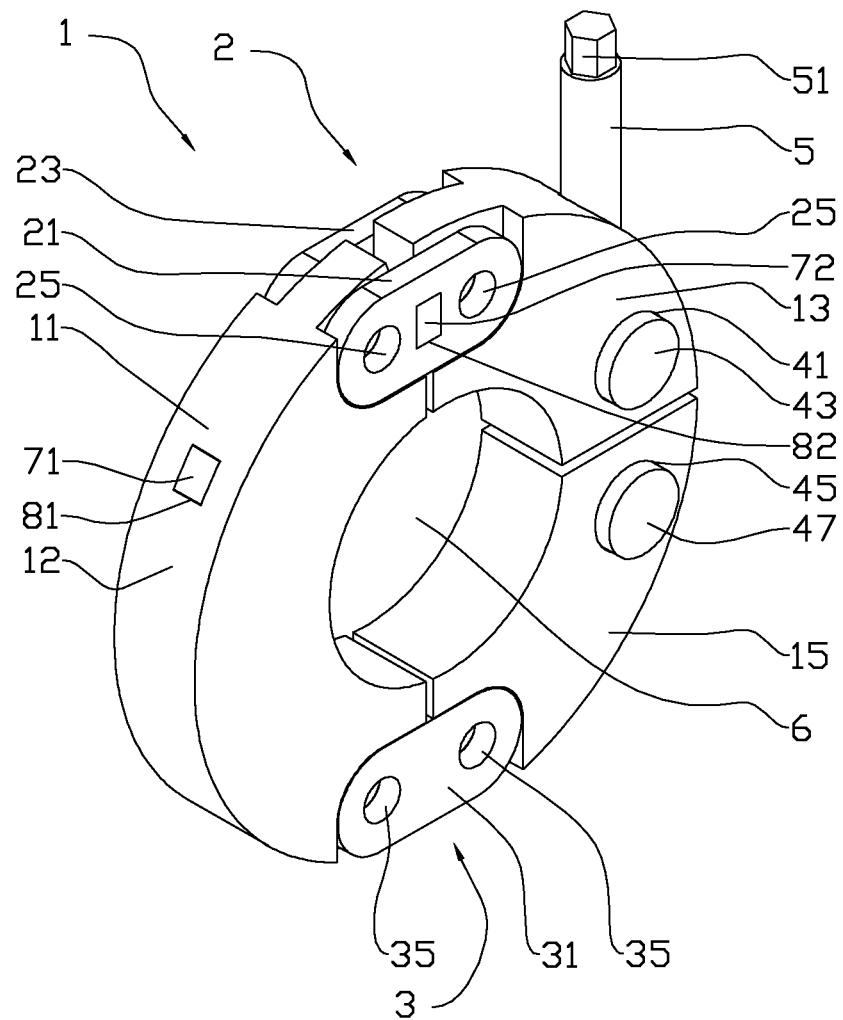
FIG. 1 shows a perspective view of a tripartite pipe clamp provided with a tension gauge in accordance with the invention.

In the figures, the reference numeral 1 indicates a pipe clamp arranged to connect two flanged pipes (not shown) or a flanged pipe to a sealing end cap (not shown). The pipe clamp 1 is shown as a tripartite pipe clamp 1, but the invention also includes other pipe clamps 1, for example bipartite pipe clamps 1, as it is known within the art. In what follows, only the parts of the pipe clamp 1 that are necessary for the understanding of the invention are mentioned.

The pipe clamp 1 includes a half segment 11 and first and second quartet segments 13, 15. The three segments 11, 13, 15 are connected by a first hinge 2 and a second hinge 3. The first hinge 2 includes a first hinge element 21 on one side of the pipe clamp 1 and a second hinge dement 23 on the opposite side of the pipe clamp 1. The hinge element 21, 23 is provided with through-going eyes 25 in its end portions. The hinge element 21, 23 is rotatably attached to pins 27 in one end portion of the half segment 11 and to pins 27 in one end portion of the first quarter segment 13. The second hinge 3 includes a first hinge element 31 on one side of the pipe clamp 1 and a second hinge element (not shown) on the opposite side of the pipe clamp 1. In its end portions, the hinge element 31 is provided with through-going eyes 35. The hinge element 31 is rotatably attached to a pin 37 in one end portion of the half segment 11 and to a pin 37 in one end portion of the second quarter segment 15.

The first quarter segment 13 is provided, in one end portion, with a through-going hole 41 with an axis which is oriented substantially parallel to the pivot axis of the hinge 2. The hole 41 accommodates a threaded bolt 43, The second quarter segment 15 is provided, in one end portion, with a through-going hole 45 with an axis which is oriented substantially parallel to the pivot axis of the hinge 3. The hole 45 accommodates a threaded bolt 47, The first quarter segment 13 is provided, in one end portion, with a cut-out (not shown) in a plane that is perpendicular to the pivot axis of the hinge 2. Correspondingly, the second quarter segment 15 is provided, in one end portion, with a cut-out (not shown) in a plane that is perpendicular to the pivot axis of the hinge 3. The threaded bolts 43, 47 are provided with threaded bores (not shown) that are oriented in the same plane as the cut-outs. A tensioning member 5 shown as a threaded bolt 5 is positioned on one side of the inner opening 6 of the pipe damp 1 and oriented perpendicularly to the pivot axis of the hinge 2, 3. The threaded bolt 5 extends through the cut-outs of the first and second quarter segments 13, 15, The threaded bolt 5 is provided with right-hand threads (not shown) in one portion and is provided with left-hand threads (not shown) in another portion. The threaded portions cooperate with respective threaded bolts 43, 47. The pipe damp 1 is opened or closed by turning the threaded bolt 5. In its free end portion, the threaded bolt 5 is provided with grooves 51 in order that a rotary tool may engage the threaded bolt 5.

The half segment 11 is provided with a recess 81 in its circumferential surface 12. In the recess 81, a strain gauge 71 of a type known per se is positioned, which is secured to the circumferential surface 12 of the half segment 11. The strain gauge 71 is embedded in a polymer which protects the strain gauge 71 from the surrounding water. The polymer fills out the recess 81 in such a way that the strain gauge 71 lies mechanically protected in the recess 81. The strain gauge 71 is provided with a contact for the strain gauge 71 to be read with a suitable apparatus as it is known within the art. An ROV (not shown), which is provided with a rotary tool for tightening the threaded bolt 5, is provided with a suitable apparatus for reading the strain gauge 71. When the strain gauge 71 indicates that the desired tension has been achieved in the pipe clamp 1, the operator of the ROV will stop the tightening of the threaded bolt 5.

Figure 2:
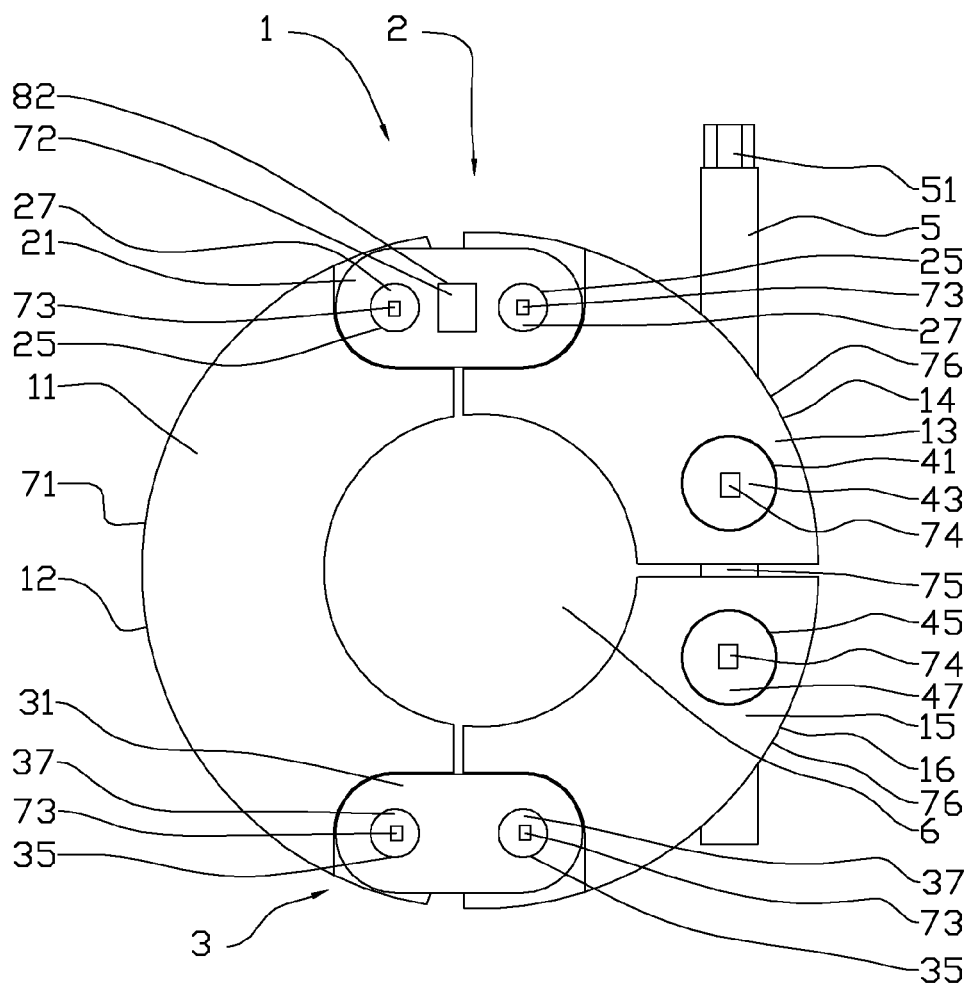
FIG. 2 shows a side view of the pipe clamp shown in FIG. 1.
Figure 3:
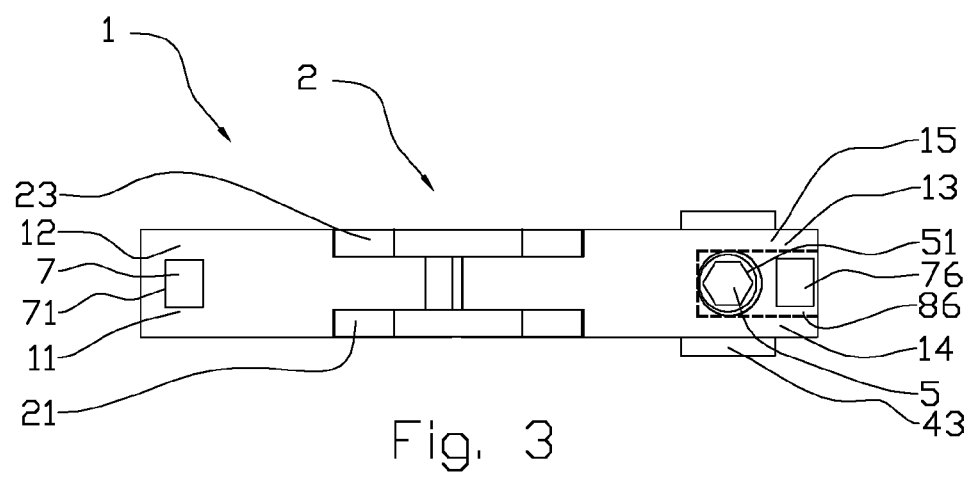
FIG. 3 shows a top view f the pipe clamp shown in figure

In FIG. 1, an alternative positioning of the strain gauge 72 in a recess 82 in a surface of the first hinge element 21 is shown. In the FIGS. 2 and 3, further alternative positions of strain gauges 73-76 are shown on the pins 27, 37; on the threaded bolts 43, 47; on the threaded bolt 5 and on the circumferential surfaces 14, 16 of, respectively, the first quarter segment 13 and the second quarter segment 15.

In the figures, the pipe damp 1 is shown schematically. The opening 6 is thus shown with a smooth inner surface, but the person skilled in the art will know that, in the opening 6, the pipe damp 1 is provided with lips and grooves necessary for holding together pipes provided with flanges at their end portions.

In the figures, it is shown that the pipe clamp 1 is provided with a threaded bolt 5 as a tensioning member. The person skilled in the art will know that a pipe clamp 1 may alternatively be provided with a tensioning member 5 that includes a hydraulic cylinder (not shown) for tensioning the pipe clamp 1. The hydraulic cylinder may be permanently fixed to the pipe clamp 1, or it may be releasably fixed. The person skilled in the art will further know that a pipe clamp 1 may alternatively be provided with a tensioning member 5 that includes a torsional actuator (not shown) to tension the pipe clamp 1. The torsional actuator may be permanently fixed to the pipe damp 1, or it may be releasably fixed. The invention also relates to pipe clamps 1 with other tensioning members 5.

The person skilled in the art will know that strain gauges 71-76 have different designs and can be used to measure compressive forces, strain forces and shear forces. Strain gauges 71-76 may also be temperature-compensating or pressure-compensating, The person skilled in the art will also know that the pipe clamp 1 may be provided with several strain gauges 71-76 at different points. Several readings of the tension of the pipe clamp 1 around the pipe will increase the certainty that the correct tension has been achieved in the pipe clamp 1.

The invention claimed is:

1. A pipe clamp for connecting submerged pipes provided with a flange, the pipe clamp comprising at least two segments connected to at least one hinge formed by hinge elements and the pipe clamp further being provided with a tensioning member arranged to open and close the pipe clamp, wherein the pipe clamp is provided with at least one strain gauge arranged to measure the tension of the pipe clamp around the flange of the pipe when the pipe clamp is closed by the tensioning member, wherein the at least one strain gauge is positioned on at least one pin in the at least one hinge.

2. The pipe clamp in accordance with claim 1, wherein another strain gauge is positioned in a recess in a circumferential surface of one of the at least two segments.

3. The pipe clamp in accordance with claim 1, wherein a further strain gauge is positioned in a recess in a surface of at least one of the hinge elements.

4. A pipe clamp for connecting submerged pipes provided with a flange, the pipe clamp comprising at least two segments connected to at least one hinge formed by hinge elements and the pipe clamp further being provided with a tensioning member arranged to open and close the pipe clamp, wherein the pipe clamp is provided with at least one strain gauge arranged to measure the tension of the pipe clamp around the flange of the pipe when the pipe clamp is closed by the tensioning member, wherein the at least one strain gauge is positioned on at least one threaded bolt provided in at least one of the at least two segments.

5. The pipe clamp in accordance with claim 4, wherein another strain gauge is positioned in a recess in a circumferential surface of one of the at least two segments.

6. The pipe clamp in accordance with claim 4, wherein a further strain gauge is positioned in a recess in a surface of at least one of the hinge elements.

7. A pipe clamp for connecting submerged pipes provided with a flange, the pipe clamp comprising at least two segments connected to at least one hinge formed by hinge elements and the pipe clamp further being provided with a tensioning member arranged to open and close the pipe clamp, wherein the pipe clamp is provided with at least one strain gauge arranged to measure the tension of the pipe clamp around the flange of the pipe when the pipe clamp is closed by the tensioning member, wherein the at least one strain gauge is positioned on the tensioning member.

8. The pipe clamp in accordance with claim 7, wherein another strain gauge is positioned in a recess in a circumferential surface of one of the at least two segments.

9. The pipe clamp in accordance with claim 7, wherein a further strain gauge is positioned in a recess in a surface of at least one of the hinge elements.

10. A method of tensioning a pipe clamp around a submerged pipe provided with a flange, wherein the method comprises:
   a) providing a pipe clamp;
   b) providing the pipe clamp with at least one strain gauge;
   c) calculating a reading value of the at least one strain gauge at a desired tensioning torque;
   d) equipping an ROV with an apparatus arranged to read the at least one strain gauge;
   e) equipping the ROV with a tool for operating a tensioning member;
   f) tensioning the pipe clamp with the tensioning member; and
   g) stopping the tensioning when the at least one strain gauge shows that the correct tension in the pipe clamp has been achieved.

* * * * *